United States Patent
Harish Gopala Pillai

(10) Patent No.: US 12,074,446 B2
(45) Date of Patent: Aug. 27, 2024

(54) METHODS AND ARRANGEMENTS FOR LOAD CONTROL

(71) Applicant: Leviton Manufacturing Co., Inc., Melville, NY (US)

(72) Inventor: Raman Nair Harish Gopala Pillai, Portland, OR (US)

(73) Assignee: Leviton Manufacturing Co., Inc., Melville, NY (US)

( * ) Notice: Subject to any disclaimer, the term of this patent is extended or adjusted under 35 U.S.C. 154(b) by 0 days.

(21) Appl. No.: 17/533,389

(22) Filed: Nov. 23, 2021

(65) Prior Publication Data
US 2022/0166251 A1 May 26, 2022

Related U.S. Application Data

(60) Provisional application No. 63/118,116, filed on Nov. 25, 2020.

(51) Int. Cl.
*H02J 50/00* (2016.01)
*H02J 7/00* (2006.01)
*H04B 5/72* (2024.01)
*H05B 47/19* (2020.01)

(52) U.S. Cl.
CPC .......... *H02J 50/001* (2020.01); *H02J 7/0068* (2013.01); *H04B 5/72* (2024.01); *H05B 47/19* (2020.01)

(58) Field of Classification Search
CPC ....... H02J 50/001; H04B 5/00; H04B 5/0031; H05B 47/19
See application file for complete search history.

(56) References Cited

U.S. PATENT DOCUMENTS

| | | | |
|---|---|---|---|
| 9,368,025 B2 | 6/2016 | Carmen, Jr. | |
| 9,386,666 B2 | 7/2016 | Economy | |
| 9,544,977 B2 | 1/2017 | Economy et al. | |
| 10,135,629 B2 | 11/2018 | Browne, Jr. et al. | |
| 10,271,407 B2 | 4/2019 | Pessina et al. | |
| 10,367,582 B2 | 7/2019 | Economy | |
| 10,484,827 B2 | 11/2019 | Baker et al. | |
| 10,516,546 B2 | 12/2019 | Browne, Jr. et al. | |
| 10,588,204 B2 | 3/2020 | Pessina et al. | |
| 2006/0281435 A1* | 12/2006 | Shearer | G06K 19/0702 455/343.1 |
| 2010/0327766 A1* | 12/2010 | Recker | H02J 7/0029 362/20 |

(Continued)

*Primary Examiner* — Rexford N Barnie
*Assistant Examiner* — Joseph N Inge
(74) *Attorney, Agent, or Firm* — KDW FIRM PLLC

(57) ABSTRACT

Embodiments may include a control device comprising an antenna; a near-field communications (NFC) module coupled with the antenna; a power storage coupled with the NFC module to harvest energy from a radio frequency (RF) field; and a wireless communications interface coupled with the power storage to receive power to generate and transmit a non-NFC radio transmission in response to the energy harvested from the RF field. Further embodiments may include a processor of the wireless communications interface to decrement a dim level in response to energy harvested from the RF field via a first antenna and to increment the dim level in response to energy harvested from the RF field via a second antenna. The wireless communications interface may then generate and transmit a non-NFC radio transmission to change the dim level.

22 Claims, 6 Drawing Sheets

(56) References Cited

U.S. PATENT DOCUMENTS

| | | | | |
|---|---|---|---|---|
| 2011/0127951 A1* | 6/2011 | Walley | ................... | H02J 50/10 |
| | | | | 320/108 |
| 2013/0030589 A1* | 1/2013 | Pessina | ................. | G05B 15/02 |
| | | | | 700/295 |
| 2013/0288621 A1* | 10/2013 | Pennisi | ................... | H02J 50/20 |
| | | | | 455/127.1 |
| 2015/0054423 A1* | 2/2015 | Tyson | ................... | H05B 47/19 |
| | | | | 315/291 |
| 2015/0188610 A1* | 7/2015 | Smith | ................. | H04B 5/0031 |
| | | | | 455/41.1 |
| 2016/0056629 A1* | 2/2016 | Baker | ................... | H05B 47/11 |
| | | | | 315/307 |
| 2016/0165702 A1* | 6/2016 | Lai | ........................ | H05B 45/22 |
| | | | | 315/297 |
| 2016/0234631 A1* | 8/2016 | Brown | ................... | H04B 5/48 |
| 2016/0309570 A1* | 10/2016 | Han | ....................... | H05B 45/10 |
| 2017/0238397 A1* | 8/2017 | Green | ................... | H05B 47/29 |
| | | | | 315/129 |
| 2017/0288468 A1* | 10/2017 | Pearson | ................. | H02J 50/90 |
| 2018/0183256 A1* | 6/2018 | Tanaka | .................. | H02J 50/001 |
| 2018/0183274 A1* | 6/2018 | Auten | .................... | H01Q 1/248 |
| 2019/0288554 A1 | 9/2019 | Baker et al. | | |
| 2020/0287598 A1* | 9/2020 | Zhou | ......................... | H02J 7/02 |
| 2020/0350781 A1* | 11/2020 | La Rosa | ................. | H02J 50/20 |

\* cited by examiner

METHODS AND ARRANGEMENTS FOR LOAD CONTROL

CROSS-REFERENCE TO RELATED APPLICATIONS

This application is a non-provisional application claiming priority to U.S. provisional patent application No. 63/118,116, filed Nov. 25, 2020, entitled "METHODS AND ARRANGEMENTS FOR LOAD CONTROL", which is hereby incorporated by reference into the present application in its entirety.

FIELD OF THE DISCLOSURE

The present disclosure relates generally to wireless load control and, more particularly, to circuitry to harvest energy from a near field communications (NFC) radio frequency field and to transmit a non-NFC wireless radio message to control a load in response to the energy harvested.

BACKGROUND OF THE DISCLOSURE

Near Field Communication (NFC) is commonly used to read NFC tags and or/store information. The NFC tags are usually passive devices, powered using radio frequency (RF) field (13.56 MHz). NFC uses inductive coupling between two nearby loop antennas effectively forming an air-core transformer. Because the distances involved are tiny compared to the wavelength of electromagnetic radiation (radio waves) of that frequency (about 22 meters), the interaction is described as near field.

NFC can involve active or passive devices. Active devices have power supplies to generate an RF field for communication with an initiator device. Passive devices receive energy from an alternating magnetic field of the RF field generated by the initiator device to modulate a carrier generated by the initiator device and thereby communicate data stored in the NFC tag to the initiator device.

Current control schemes using NFC rely on data storage and retrieval. For instance, an NFC tag is used to store lighting presets, which are retrieved using a phone. The phone then may use this information to actuate a lighting system.

SUMMARY OF THE INVENTION

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Some embodiments include a control device. The control device may comprise an antenna; a near-field communications (NFC) module coupled with the antenna; a power storage coupled with the NFC module to harvest energy from a radio frequency (RF) field; and a wireless communications interface coupled with the power storage to receive power to generate and transmit a non-NFC radio transmission in response to the energy harvested from the RF field.

Further embodiments include another control device. The control device may comprise a first antenna; a first near-field communications (NFC) module coupled with the first antenna; a second antenna; a second NFC module coupled with the second antenna; a power storage coupled with the first NFC module and with the second NFC module to harvest energy from a radio frequency (RF) field; and a wireless communications interface coupled with the power storage to receive power to: execute code with a processor of the wireless communications interface to cause the processor to decrement a dim level for a lighting load in response to energy harvested from the RF field via the first antenna and to increment the dim level for the lighting load in response to energy harvested from the RF field via the second antenna; and generate and transmit a radio transmission to indicate the dim level to cause a change in the dim level of the lighting load.

BRIEF DESCRIPTION OF THE DRAWINGS

By way of example, specific embodiments of the disclosed device will now be described, with reference to the accompanying drawings, in which.

DETAILED DESCRIPTION

Figure 1:
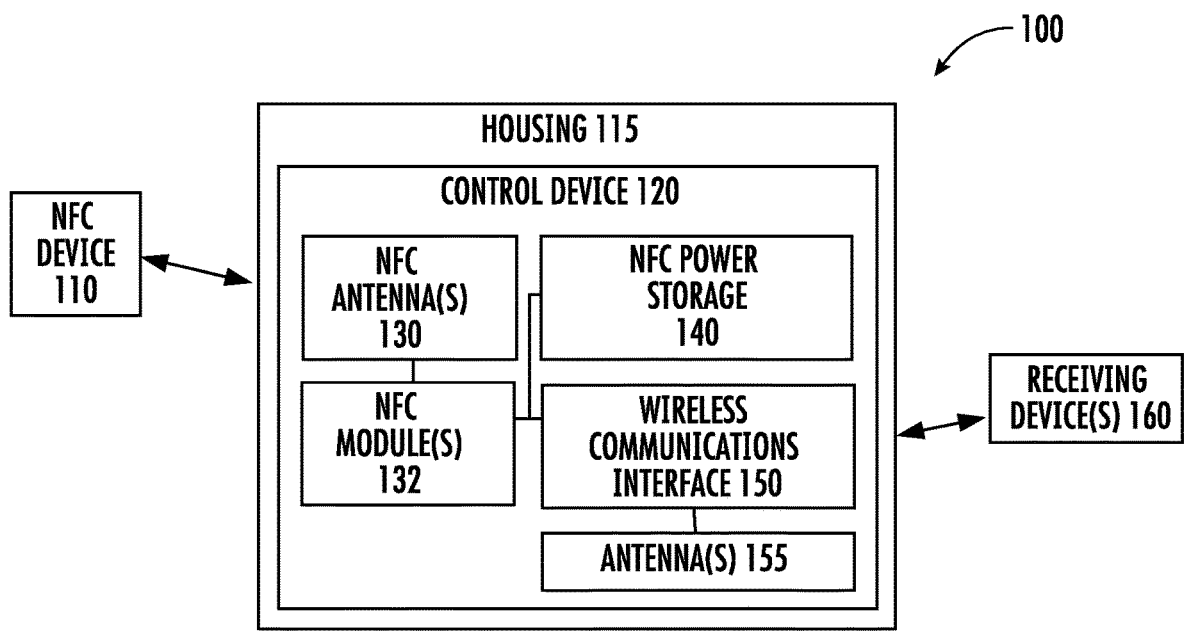
FIG. 1 illustrates an embodiment of a system including an NFC device, a control device, and one or more receiving devices.

Devices, systems, and methods in accordance with the present disclosure will now be described more fully hereinafter with reference to the accompanying drawings, in which preferred embodiments of the devices, systems, and methods are shown. The disclosed devices, systems, and method, however, may be embodied in many different forms and should not be construed as being limited to the embodiments set forth herein. Rather, these embodiments are provided so that this disclosure will be thorough and complete, and will fully convey the scope of the devices, systems, and methods to those skilled in the art. In the drawings, like numbers refer to like elements throughout.

Embodiments disclosed herein enable a near field communication (NFC) device, such as a mobile phone, to transfer data and/or energy to a non-powered or battery-powered lighting control device as a primary power source or an emergency power source. The control device is configured to capture/harvest and use RF energy provided in an RF field generated by the NFC device and to subsequently send new non-NFC wireless data with the harvested energy. In many embodiments, the control device may advantageously communicate with one or more luminaires or other receiving devices, a lighting control system, a security control system, or another type of control system via a non-NFC wireless communications protocol. Non-NFC wireless communications protocols may include, e.g., low power Wi-Fi protocols such as 802.11ah based protocols, wireless personal area network (WPAN) protocols such as 802.15.4 or 802.15.1 based protocols, Adaptive Network Topology (ANT) wireless based protocols, Bluetooth protocols such as Bluetooth Low Energy (BLE) protocols, Z-wave protocols, Zigbee protocols, or the like to change behavior of such devices or systems. For instance, the control device may receive an instruction to turn on lighting in a portion of a floor of a building based on NFC data received from a mobile phone with an NFC radio. The control device may harvest energy from the NFC RF field generated by the NFC radio and transmit a packet via, e.g., Zigbee to a lighting control system to turn on one or more lights on the floor. In some embodiments, a central wireless hub is implemented to, advantageously, disconnect power from a lighting system to achieve a "zero" power control system. Disconnecting power from the lighting system may, advantageously, include disconnection from switches sensors, lighting fixtures, and/or the like to avoid or attenuate power leakage. In such embodiments, the control device may comprise one or more deenergized switches, sensors, hubs, or other control devices within the lighting system that are capable of harvesting energy from an NFC module of the mobile phone and/or other device. The mobile phone may provide energy and, in some embodiments a command, authorization, and/or other data to the deenergized control device to transmit via a non-NFC wireless radio transmission to the central hub to energize at least a portion of the lighting system such as one or more luminaires, switches, sensors, hubs, and/or the like.

Many embodiments comprise a housing such as a switch housing or other housing to contain a control device. Such embodiments are advantageously easy to install at a location of convenience such as on a wall, in a wall, or on a table or desk considering that many embodiments do not have to be wired to an electrical system or connected to an electrical outlet.

Some embodiments are not affixed. Other embodiments may be installed in a junction box in a wall or otherwise affixed to a wall, table, desk, or the like. For example, some embodiments may comprise a housing for installation on a wall such as a wall plate that includes a printed circuit board coupled to the wall side of the wall plate. Such embodiments may include one or more antennas to provide controls for, e.g., multiple lighting devices. The control device may harvest energy from the RF field of an NFC device, receive one or more commands for the lighting devices, and transmit the commands either in non-NFC broadcast transmissions to the multiple lighting devices or as a series of non-NFC radio transmissions to each of the lighting devices individually.

Embodiments may harvest energy via one or more NFC antennas coupled with NFC modules. When the NFC device creates an RF field such as a carrier field near the control device to facilitate communication with a passive NFC module of the control device, the one or more NFC antennas may receive energy from an alternating electromagnetic field of the RF field and pass the energy to an NFC power storage via the NFC module(s).

In many embodiments, the NFC power storage may, advantageously couple with a wireless communications interface to power the wireless communications interface and to transmit one or more asymmetric or non-NFC radio transmissions in response to harvesting energy from the RF field. For example, in some embodiments, the control device may comprise a dim level controller for one or more luminaires (lighting devices). The dim level controller (or dimmer) may control the dim level (brightness or light level) of the luminaires. The control device may comprise memory to store the latest dim level in memory and, based on the latest dim level of the one or more luminaires, advantageously adjust the dim level incrementally for a duration related to the duration of contact with the RF field created by the NFC device. For instance, the energy harvested from the RF field may be related to the duration of the contact with the RF field and the control device may incrementally adjust the dim level of the luminaire with a series of radio transmissions until the energy harvested is exhausted or until there is not enough energy left to accomplish another wireless transmission via the wireless communications interface. Note that a dim level of a luminaire may be a brightness or light intensity between zero percent and 100 percent, including zero percent and 100 percent. Note also that such a control device can also or alternatively adjust other characteristics of a luminaire such as a color temperature.

Several embodiments include a voltage regulator at the output of the NFC power storage to prevent the NFC power storage from supplying power at a voltage that exceeds the maximum voltage specified for the wireless communications interface. In some embodiments, the voltage regulator comprises one or more Zener diodes in parallel at the output of the NFC power storage.

In some embodiments, the wireless communications interface may include a power on reset (POR) and a brown out detect (BOD). The POR may comprise a voltage at a power input at which the wireless communications interface will begin operation to transmit and/or receive non-NFC communications. The BOD may comprise a voltage at a power input at which the wireless communications interface will terminate operations to transmit and/or receive communications. The POR and BOD voltages may be programmable or fixed.

One of the technical problems associated with attempting to power a wireless communications interface with energy captured from and RF field is that the wireless communications interface may repeatedly power on operations and power off operations as a result of the POR and the BOD. For instance, once the NFC power storage captures sufficient energy to supply power at the POR voltage, the wireless communications interface may power on operations and begin a non-NFC radio transmission. During or after a radio transmission, the voltage at the output of the NFC power storage may drop as a result of the reduction in energy stored and, thus, the voltage of the input power for the wireless communications interface may drop below the BOD, causing the wireless communications interface to cease operations.

Some embodiments address the technical problem of repeatedly powering on operations and powering off operations as a result of the POR and the BOD by implementing a wireless communications interface with a programmable POR and/or a programmable BOD. With the programmable POR and/or a programmable BOD, the POR and/or the BOD can be programmed to create a hysteresis circuit for powering on and powering off the wireless communications interface. For instance, the wireless communications interface may comprise an integrated circuit (IC) with an operational voltage range of 1.6 volts to 3.7 volts. In such embodiments, the POR may be programmed to 3.7 volts and/or the BOD may be programmed to 1.6 volts to, e.g., maximize the voltage range of useable power from the NFC power storage.

Other embodiments may implement a voltage monitor between the output of the NFC power storage and the wireless communications interface to effectively establish a hysteresis circuit for powering the wireless communications interface. For instance, the voltage monitor may block the power supply from the NFC power storage until the voltage output from the NFC power storage reaches, e.g., 3.7 volts, and/or the voltage monitor may block the power supply from the NFC power storage once the voltage output from the NFC power storage reduces below, e.g., 1.6 volts.

In several embodiments, the wireless communications interface includes a processor such as a baseband processor to implement data layer and physical layer operations as well as analog and/or digital signal processing to prepare a non-NFC communication for transmission via a radio or to interpret a non-NFC communication received via the radio. Many embodiments advantageously leverage the processing capability of the wireless communications interface by provision of code and, in some embodiments, data. In such embodiments, the processor of the wireless communications interface may execute the code and/or access the data to perform operations and/or process commands received from an NFC module of the control device to perform operations responsive to the energy harvested from the RF field of an NFC device. To illustrate, some embodiments include two NFC modules, each coupled with a separate NFC antenna. A first NFC module may transmit a first command to the wireless communications interface if an NFC device generates an RF field at the antenna coupled with the first NFC module. Similarly, a second NFC module may transmit a second command to the wireless communications interface if an NFC device generates an RF field at the antenna coupled with the second NFC module.

In some embodiments, the NFC modules couple with the wireless communications device via a bus such as a serial bus to transmit the commands. In such embodiments, the wireless communications interface may transmit a first non-NFC radio transmission in response to the first command or a second non-NFC radio transmission in response to the second command. Such radio transmissions may turn on certain luminaires, change the dim level of certain luminaires, adjust the color temperature of certain luminaires, communicate an access authorization to a security control device to initiate air conditioning for a certain space within a building, communicate an access authorization to a security control device to initiate lighting for a certain space within a building, and/or the like. In one embodiment, the first non-NFC radio transmission may deenergize at least a portion of a lighting system via a central hub and the second non-NFC radio transmission may energize at least a portion of the lighting system via the central hub.

In some embodiments, the first command may initiate a series radio transmissions to increment a dim level of a luminaire and the second command may initiate a series radio transmissions to decrement a dim level of the luminaire. In some of these embodiments, the first command may initiate execution of code by the processor in the wireless communications interface to repeatedly increment the dim level linearly or exponentially (e.g., via a look-up table in memory) until the operations cease due to lack of power available in the NFC power storage or until the dim level (light intensity level) reaches the maximum setting such as 100 percent of the rated output or output capability of the luminaire. Similarly, the second command may initiate execution of code by the processor in the wireless communications interface to repeatedly decrement the dim level linearly or exponentially (e.g., via the look-up table in the memory) until the operations cease due to lack of power available in the NFC power storage or until the dim level (light intensity level) reaches the minimum setting such as zero percent or zero lumens. Such embodiments may advantageously adjust the dim level of a luminaire in relation to the duration of contact between the RF field generated by the NFC device and the NFC antenna of the control device.

Several embodiments comprise a wireless communications interface to communicate via one or more wireless communication protocols such as Bluetooth or Bluetooth Low Energy in accordance with, e.g., the Bluetooth Core Specification v5.0 published Dec. 6, 2016, Bluetooth Mesh, Near Field Communication, Zigbee or Z-wave, one or more infrared communication protocols, etc. Further embodiments implement one or more Institute of Electrical and Electronics Engineers (IEEE) 802.11 standards (sometimes collectively referred to as "Wi-Fi") such as IEEE 802.11ah and/or wireless personal area network (WPAN) protocols such as 802.15.1 Or 802.15.4. Such standards may include, for instance, the IEEE 802.15.4-2020-IEEE Standard for Low-Rate Wireless Networks, published Jul. 23, 2020, and the IEEE 802.11ah-2016, published May 5, 2017. Some embodiments implement the IEEE standards in accordance with a Wi-Fi Alliance specification such as the Wi-Fi Peer-to-Peer (P2P) technical specification version 1.7, published Jul. 6, 2016. Some embodiments implement a combination of one or more protocols of one or more of the standards and/or specifications. The embodiments are not limited to these standards and specifications.

FIG. 1 illustrates an embodiment of a system 100 including an NFC device 110, a control device 120, and one or more receiving device(s) 160. The NFC device 110 may be a processor-based device that includes an NFC radio and other circuitry, such as a smart phone executing an app, to allow a user to interact with the control device 120. In the present embodiment, the control device 120 may reside in a housing 115 and may include circuitry such as NFC antenna(s) 130, NFC module(s) 132, NFC power storage 140, a wireless communications interface 150, and antenna(s) 155. The housing 115 may comprise any form such as the forms shown in FIGS. 6-7, to contain components or elements of the control device 120 shown in FIGS. 1-5. In many embodiments, the form of the housing 115 may be application-specific for installations in particular locations and/or for particular uses. In some embodiments, the housing 115 may include a physical switch and/or dim level selector to control the lighting coupled with the receiving device(s) 160.

The control device 120 may reside on a printed circuit board (PCB) that may physically connect components or elements such as the NFC antenna(s) 130, NFC module(s) 132, NFC power storage 140, wireless communications interface 150, and antenna(s) 155 together via conductors on the PCB and/or via one or more circuit board connectors and/or conductors. In other embodiments, the components or elements may reside on the more than one printed circuit boards (PCBs) interconnected via connectors and/or conductors.

To use the control device 120, a user may bring the NFC device 110 near the NFC antenna(s) 130 to generate an RF field with an alternating electromagnetic field. The NFC antenna(s) 130 may capture energy from the alternating electromagnetic field and pass the energy to the NFC module(s) 132 and the NFC power storage 140. The NFC antenna(s) 130 may comprise one or more loops of a conductor such as copper and may be printed on or attached to a printed circuit board.

The NFC module(s) 132 may comprise a passive NFC circuit to transmit and/or receive data from the NFC device 110 via the RF field created by the NFC device 110. For instance, the NFC module(s) 132 may modulate a carrier field generated by the NFC device 110 to communicate a tag or identifier to the NFC device 110 and/or receive data such as a command, a lighting identification, a security identification, authentication information, a personal identification number (PIN), a user identification, an office location identifier, an address for the lighting devices such as an Internet protocol (IP) address or a medium access control (MAC) address, and/or other data.

To illustrate, a user may execute an app on a smart phone to adjust lighting in a room including the brightness and/or the color temperature of one or more light emitting diode (LED) fixtures. The user may set the brightness or adjust the brightness via interaction with the app and/or set the color via interaction with the app. The user may bring the smart phone near the NFC antenna(s) 130 to set/adjust the brightness and/or set the color temperature via interaction with the app.

The NFC power storage 140 may harvest the energy from the NFC device 110 by storing the energy in a power storage element such as a capacitor, a battery, and/or the like. In some embodiments, the NFC power storage 140 may include circuitry to reduce leakage, regulate a voltage output, and/or the like.

After the NFC power storage 140 harvests enough energy to operate the wireless communications interface 150, the wireless communications interface 150 may power on and initiate a non-NFC radio transmission. In the present example, the wireless communications interface 150 may receive settings or adjustments for the brightness and/or color temperature of the lighting fixtures associated with the receiving device(s) 160 via a bus interconnecting the NFC module(s) 132 with the wireless communications interface 150. The wireless communications interface 150 may then generate a packet for transmission including the settings and transmit the packet in a non-NFC radio transmission to the receiving device(s) 160 to change the lighting settings.

The wireless communications interface 150 may comprise a wireless communications interface capable of wirelessly communicating with the receiving devices(s) 160 via one or more wireless communication protocols such as Bluetooth, WPAN, Wi-Fi, ZigBee, Z-Wave, ANT, or the like. In some embodiments, the wireless communications interface 150 comprises a wireless communications interface capable of wirelessly communicating via one or more wireless communication protocols such as Bluetooth, WPAN, Wi-Fi, ZigBee, Z-Wave, ANT, or the like.

In some embodiments, the wireless communications interface 150 may include code and/or data in memory to support operations of the control device 120. In such embodiments, the wireless communications interface 150 may receive data and/or commands from the NFC device 110 via the NFC module(s) 132 and perform the operations indicated by the NFC device 110.

In other embodiments, the control device 120 may include other circuitry such as processors, state machines, logic gates, application specific integrated circuits (ASICs), field programmable gate arrays (FPGAs), or the like to interact with the wireless communications interface 150 to perform operations. In such embodiments, the other circuitry may receive instructions/commands and/or data from the NFC device 110 via the NFC module(s) 132, process the instructions/commands and/or data, and communicate instructions to the wireless communications interface 150 to perform the indicated operations by transmitting one or more packets to the receiving device(s) 160 via the antenna(s) 155.

The antenna(s) 155 may comprise one or more RF conductors, an IC including one or more arrays of antenna elements, and/or the like. In some embodiments, the antenna(s) 155 may be part of the same chip package as an IC for the wireless communications interface 150. In other embodiments, the antenna(s) 155 are distinct elements or reside in a separate chip package from the wireless communications interface 150. In one embodiment, at least one of the antenna(s) 155 resides on the same IC as the wireless communications interface 150.

The receiving device(s) 160 may include luminaires, other lighting devices, security devices, lighting control systems, security control systems, air conditioning control systems, other control systems, and/or the like that comprise wireless communications interfaces to wirelessly receive and process communications from the control device 120. The receiving device(s) 160 may receive communications from the control device 120 to perform operations such as reduce the dim level of a light, change the color temperature of a light, increase the dim level (brightness) of a light, turn on lighting in an area of a building, turn on air conditioning on a floor of a building, and/or the like.

In other embodiments, the wireless communications interface 150 may communicate with one or more receiving device(s) 160 that include a control module such as a central wireless hub or a control module accessible via a central wireless hub. The control module may communicate with the wireless communications interface 150 via a wireless communication protocol. The control module may be, e.g., a hub, a gateway, a site controller, a combination thereof, or the like. For example, control device 120 may generate and transmit an instruction to power off a load to the control module. The control module may respond by instructing a power disconnect device (such as a switch) to disconnect power to a load connected to the power disconnect device.

Figure 2:
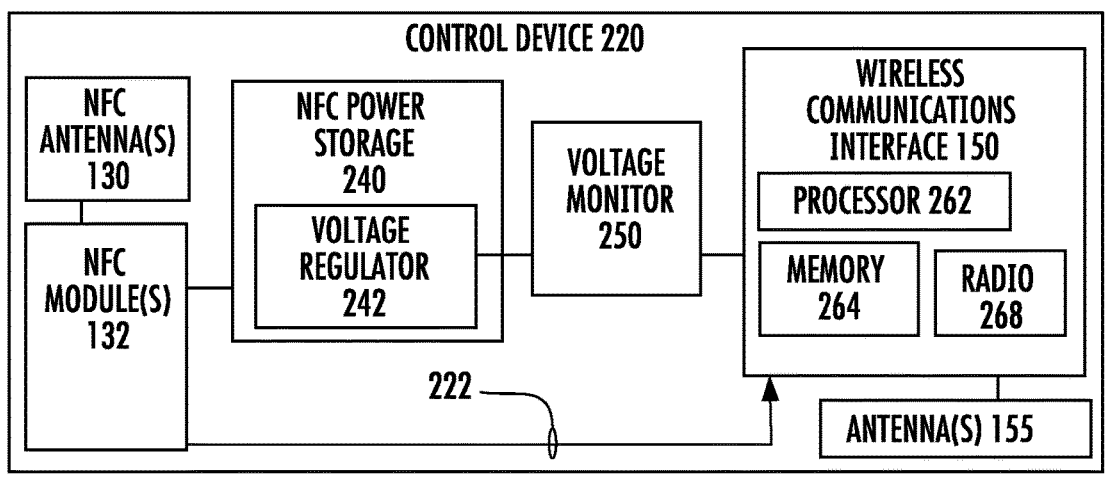
FIGS. 2-4 illustrates alternative embodiments of a control device such as the control device shown in FIG. 1.
Figure 3:
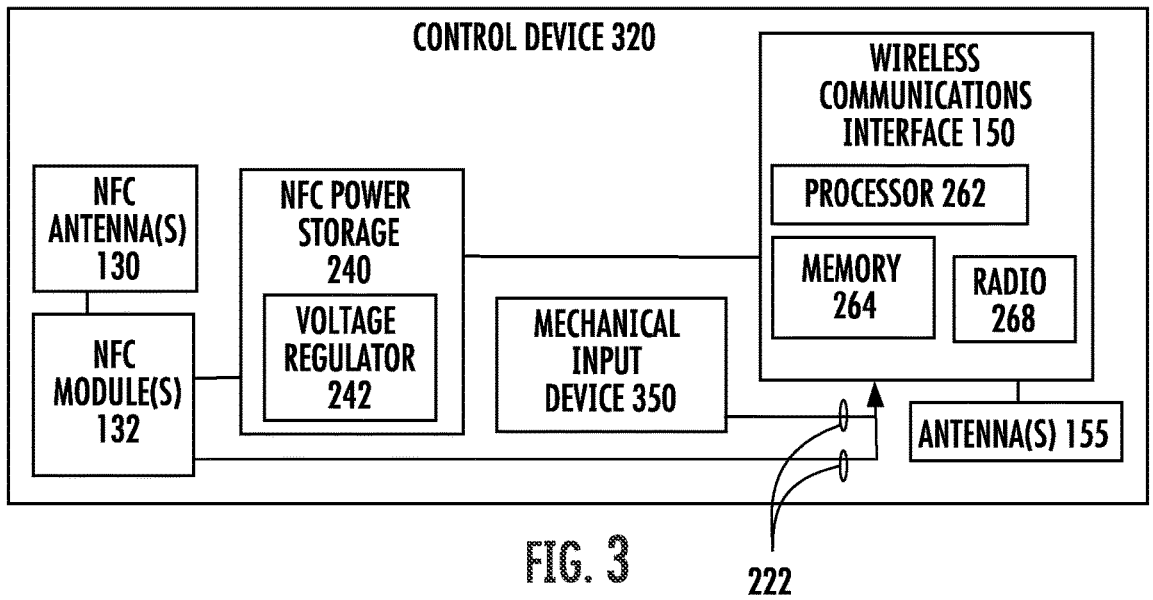
Figure 4:
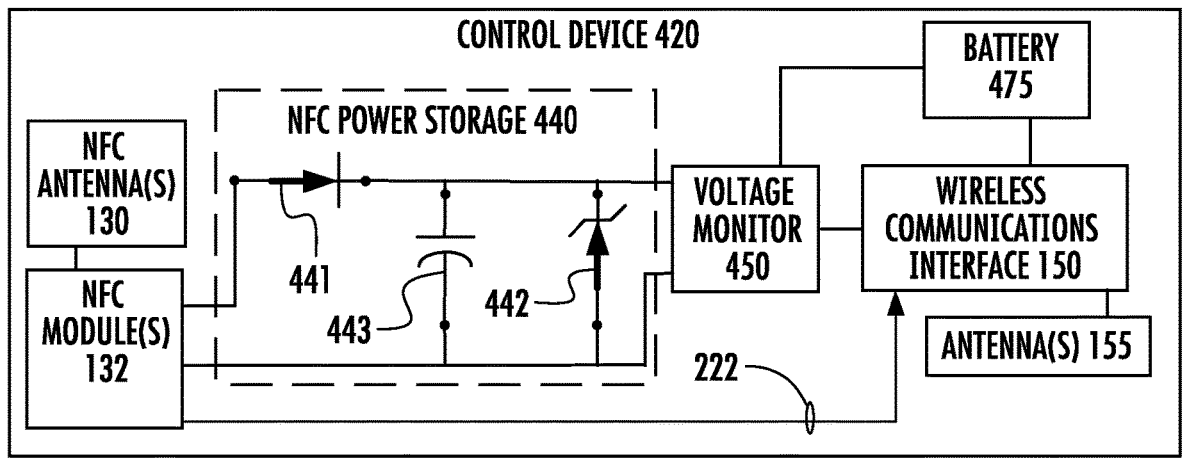

FIGS. 2-4 illustrates embodiments of control devices such as the control device 120 shown in FIG. 1. FIG. 2 illustrates an embodiment of a control device 220 such as the control device 120 shown in FIG. 1. The control device 220 comprises the NFC antenna(s) 130 and NFC module(s) 132 as discussed in conjunction with FIG. 1. In this embodiment, the control device 220 also comprises a bus 222 coupling the NFC module(s) 132 with the wireless communications interface 150, an NFC power storage 240, a voltage monitor 250, and the wireless communications device 150 comprising a processor, memory 264, and a radio 268.

The NFC power storage 240 comprises a voltage regulator 242 at the output of the NFC power storage 240 to prevent the voltage from exceeding a voltage threshold such as largest voltage intended to be applied to the voltage monitor 250 and/or the largest voltage intended to be applied to the input of the wireless communications interface 150. For instance, in some embodiments, the voltage regulator 242 may prevent the voltage at the output of the NFC power storage 240 from exceeding the maximum rated input voltage for the voltage monitor 250 and/or the wireless communications interface 150. In other embodiments, the voltage regulator 242 may maintain the voltage between an upper threshold and a lower threshold voltage.

The voltage monitor 250 may comprise circuitry to hold the wireless communications interface 150 in reset or to otherwise prevent application of power to the input of the wireless communications interface 150 until the voltage at the output of the voltage regulator 242 reaches a specified voltage. For example, if the maximum operating voltage for the wireless communications interface 150 is 3.9 volts and the fixed POR is 2.5 volts, the voltage regulator 242 may maintain the voltage near, e.g., 3.8 volts or below during transitory and steady-state operating conditions. The voltage monitor 250 may advantageously prevent the application of power to the input of the wireless communications interface 150 until the voltage at the output of the voltage regulator 242 reaches 3.7 volts. Preventing the application on power until the voltage at the output reaches 3.7 volts may, advantageously, increase the voltage swing available for energy transfer from the NFC power storage 240 to the wireless communications interface 150 before the voltage drops below the BOD for the wireless communications interface 150. In some embodiments, the voltage regulator 250 may also terminate the power input from the NFC power storage 240 to the wireless communications interface 150 before reaching the BOD.

The NFC module(s) 132 may couple with the wireless communications interface 150 via the bus 222 to communicate data related to an energy harvest from an NFC device. In some embodiments, the processor 262 may receive the data from the NFC module(s) 132 and execute code from memory 264 to process the data. In some embodiments, the data may include a command to transmit in a packet to a receiving device. In such embodiments, the processor 262 may provide the data to a physical layer for inclusion in a payload in a physical layer packet to transmit via a non-NFC wireless communications protocol to the receiving device.

In further embodiments, the NFC module(s) 132 may communicate a command to transmit a particular type of packet and may, in some embodiments, also include data to transmit in the particular type of packet such as the recipient address and/or other data for the packet. For example, a user may execute an app on a smart phone to adjust the color temperature of the lighting in a particular room. The room may include the control device 220 installed on a wall within the room and may include NFC module(s) 132 containing the recipient address of each of the lighting fixtures installed in the room as well as a group address for all the lighting fixtures installed in the room. The smart phone may read the addresses from the NFC module(s) 132, receive a color temperature setting value from the user and transmit a command to the NFC module(s) 132 to transmit a packet to the group address and along with the color temperature setting value.

The NFC module(s) 132 may transmit the command to the processor 262 with the group address and the color temperature setting value via the bus 222. The bus 222 may comprise a serial bus such as an inter-integrated circuit (I2C) bus (also referred to as an I squared C bus) or a serial peripheral interface (SPI) bus. In other embodiments, the bus 222 may comprise a parallel bus.

The processor 262 may execute code from the memory 264 to interpret the command and generate and transmit a corresponding packet in a non-NFC radio transmission. The processor 262 may address the packet to the group address and may include the color temperature setting value as a configuration for the lighting fixture or as a payload of the packet. In some embodiments, the processor 262 may obtain the frame format for the packet from the memory 264 and may transmit the packet via the radio 268 and the antenna(s) 155.

FIG. 3 illustrates an alternative embodiment of a control device 320 such as the control devices shown in FIG. 1-2. The control device 320 comprises the NFC antenna(s) 130, NFC module(s) 132, NFC power storage 240, and the wireless communications device 150 coupled with the antennas 155 as discussed in conjunction with FIGS. 1-2. In this embodiment, the control device 320 also comprises a mechanical input device 350 coupled with the bus 222.

The mechanical input device 350 may comprise a switch or an actuator to receive physical input from a user to connect or disconnect power from a load of one or more of the receiving device(s) 160. In some embodiments, the mechanical input device 350 may comprise a first position to indicate connection of power to a load of one or more of the receiving device(s) 160 and a second position to indicate disconnection of power to a load of one or more of the receiving device(s) 160. In further embodiments, the mechanical input device 350 may also comprise a dim level selector such as a second switch or a slide bar to allow the user to physically select the default dim level of one or more lighting loads of one or more of the receiving device(s) 160.

In some embodiments, the mechanical input device 350 may transmit the state of the mechanical input device 350 to the processor 262 via the bus 222 in response to harvesting energy from an RF field and/or in response to a change in the state of the mechanical input device 350. In such embodiments, when only a small number of devices couple with the bus 222, the devices such as the NFC module(s) 132 and the mechanical input device 350 may verify the bus is not busy prior to transmitting data on the bus 222. Other embodiments may implement a bus monitoring period or back off period for devices coupled with the bus 222. Still other embodiments may implement an arbitration mechanism or protocol for access to the bus 222.

The processor 262 of the wireless communications interface 150 may execute code from memory 264 to process the input from the mechanical input device 350, generate a packet to implement the changes in the state of the mechanical input device 350, and transmit the packet in a non-NFC radio transmission to the receiving device(s) 160 associated with the mechanical input device 350. For instance, some embodiments may associate the state of a mechanical input device 350 with one or more receiving device(s) 160 by storing the association with recipient addresses for the one or more receiving device(s) 160 in memory of the mechanical input device 350 or in the memory 264 of the wireless communications interface 150. If the association with recipient addresses for the one or more receiving device(s) 160 is stored in memory of the mechanical input device 350, the association with recipient addresses for the one or more receiving device(s) 160 may transmit with the state of mechanical input device 350 to the wireless communications interface 150 via the bus 222. Otherwise, the processor 262 may associate the recipient addresses for the one or more receiving device(s) 160 with the address of the mechanical input device 350 in the memory 264.

FIG. 4 illustrates an alternative embodiment of a control device 420 such as the control devices shown in FIGS. 1-3. The control device 420 comprises the NFC antenna(s) 130, NFC module(s) 132, NFC power storage 240, and the wireless communications device 150 coupled with the antennas 155 as discussed in conjunction with FIGS. 1-3. In this embodiment, the control device 420 also comprises circuitry for an NFC power storage 440 and a battery 475 coupled with the wireless communications interface 150 and a voltage monitor 450. The NFC power storage 440 may include one or more diodes 441 to rectify the alternating power received from the RF field. In other words, during the harvesting of the energy from the RF field, the diodes 441 create a charge pump that directs the energy into one or more power storage elements such as the capacitor 443. The capacitor 443 may store the energy, increasing the voltage differential between the positive and negative lead on the capacitor as the charge builds. Note that while the capacitor shown is a polar capacitor, other embodiments implement nonpolar capacitors.

The voltage differential of the capacitor 443 is in parallel with one or more Zener diodes 442 at the output of the NFC power storage 440. The Zener diodes 442 may regulate the voltage output of the NFC power storage 440 based on the reverse breakdown voltage of the Zener diodes 442. For instance, if the reverse breakdown voltage of the Zener diodes 442 is 3.6 volts, the Zener diodes 442 will maintain a voltage close to 3.6 volts or less at the output of the NFC power storage 440 even when the voltage differential across the capacitors 443 exceeds 3.6 volts.

The capacitor value is chosen such that it is large enough to store energy required for downstream radio operation (the non-NFC radio transmission) and small enough to reach the required threshold voltage for operation of the wireless communications interface 150. If the capacitor 443 is too large, the capacitor voltage will not rise to minimum operating voltage (1.6V–1.8V) during a feasible time period for application of the RF field to the NFC antenna(s) 130. As an example, current sourced from NFC RF field may be in the range between 1 milliamps (mA) and 5 mA.

$$I=C*d/dt$$

$$dt=CdV/I$$

where I is the amperes, C is the capacitance of the capacitor or the equivalent capacitance of an arrangement of multiple capacitors in Farads, dV is the change in the voltage differential across the capacitor, and dt is the amount of time in seconds.

For example, dV=3.7V (maximum operating voltage for wireless communications interface)−1.6V (minimum operating voltage for wireless communications interface)=2.1V Assume I=1 mA (typical source current from NFC RF field)

If C=560 uF (microFarads), then dt=1.18 seconds

This means that if the wireless communications interface 150 is powered from a capacitor charged to 3.7V, the wireless communications interface 150 can operate drawing 1 mA for 1.18 s. If current consumption of the wireless communications interface 150 were in parity with source current from NFC RF field, no additional measures would be required. But in practice, radio ICs like the wireless communications interface 150 may require current in bursts for radio transmissions. Furthermore, most radio ICs start operating at the minimum start voltage threshold, known as Power On Reset (POR) which is around 1.8V and stop operating at 1.6V (Brown Out Detect or BOD threshold). With such a small voltage window, the radio IC may inevitably get into a hiccup mode periodically starting and stopping due to insufficient energy.

For embodiments in which the POR is not programmable, the voltage monitor 450 may monitor the voltage of the output of the NFC power storage 440 to prevent the NFC power storage 440 from powering the wireless communications interface 150 until the voltage at the output reaches, e.g., 3.7 volts. In other embodiments, where the POR of the wireless communications interface 150 is programmable, the voltage monitor 450 may not be used or may only be used to detect the voltage or other aspect of the battery 475.

In the present embodiment, the NFC power storage 440 acts as an emergency power source for operations after the battery 475 can no longer power the wireless communications interface 150. The voltage monitor 450 may monitor the voltage of the battery and/or one or more other characteristics of the battery that might indicate that the battery is no longer able to power the wireless communications interface 150. If the control device 420 receives an instruction from an NFC device, the battery 475 appears to have insufficient power to power the wireless communications interface 150, the voltage monitor 450 may allow the NFC power storage 440 to power the wireless communications interface 150 to generate and transmit a non-NFC radio transmission in response to the instruction from the NFC device received via the NFC module(s) 132.

Figure 5A:
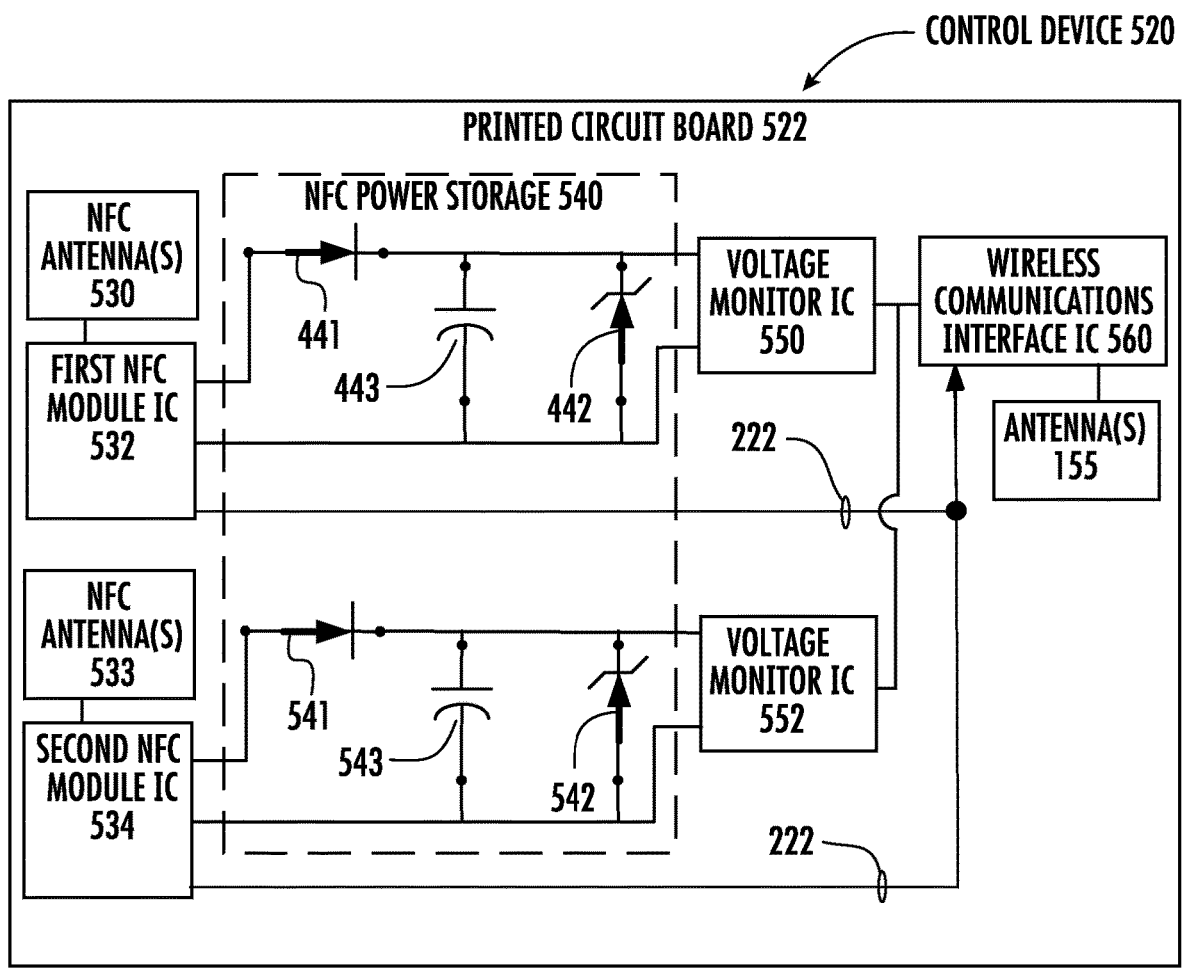
FIG. 5A illustrates an alternative embodiment of a control device such as the control device shown in FIG. 1.

FIG. 5A illustrates an alternative embodiment of a control device such as the control devices shown in FIGS. 1-4. The control device 520 illustrates an arrangement for two or more NFC modules and an embodiment of the ICs for components described and illustrated in FIGS. 1-4 installed on a printed circuit board (PCB) 522. Note that the relative sizes and arrangements of the ICs, antennas, and other circuitry may not be representative of the actual sizes and arrangements in many embodiments.

The control device 520 comprises two distinct NFC module ICs, a first NFC module IC 532 coupled with the NFC antennas 530 and a second NFC module IC 534 coupled with NFC antennas 533. The first and second NFC module ICs 532 and 524 operate as the NFC modules 132 shown in FIGS. 1-4.

The arrangement of the control device 520 advantageously facilitates two distinct inputs from a user via an NFC device by locating the NFC device near the NFC antennas 530 or locating the NFC device near the NFC antennas 533. The arrangement advantageously supports the two distinct inputs without necessarily adding the overhead associated with communication of commands from the NFC device to the wireless communications interface 560. For example, the control device 520 may comprise a dimmer switch that receives input by placing the NFC device near the NFC antennas 530 to increment the brightness of a luminaire in relation to the duration for which the NFC device generates an RF field at the NFC antennas 530. Similarly, the dimmer switch may receive input by placing the NFC device near the NFC antennas 533 to decrement the brightness of a luminaire in relation to the duration for which the NFC device generates an RF field at the NFC antennas 533.

In the present embodiment, the NFC power storage 540 includes one or more rectifier diodes 441 to rectify the energy received via the NFC antennas 530, a power storage element such as one or more batteries (not shown) and/or one or more capacitors 443, and one or more Zener diodes 442 to act as a voltage regulator or voltage shunt. The voltage monitor IC 550 may hold the wireless communications interface IC 560 in reset or otherwise prevent the NFC power storage 540 from powering the wireless communications interface IC 560 until the voltage output is at a high or threshold operating voltage.

The NFC power storage 540 also includes one or more rectifier diodes 541 to rectify the energy received via the NFC antennas 533, a power storage element such as one or more batteries (not shown) and/or one or more capacitors 543, and one or more Zener diodes 542 to act as a voltage regulator or voltage shunt. The voltage monitor IC 552 may hold the wireless communications interface IC 560 in reset or otherwise prevent the NFC power storage 540 from powering the wireless communications interface IC 560 until the voltage output is at a high or threshold operating voltage.

The first NFC module IC 532 or the second NFC module IC 534 may transmit an indication to the wireless communications interface IC 560 via the bus 222 to indicate which NFC module IC received the input and harvested the energy to power the wireless communications interface IC 560. The wireless communications interface IC 560 may perform functionality as the wireless communications interface 150 shown in FIGS. 1-4. For instance, the wireless communications interface IC 560 may determine that the energy is harvested via the first NFC module IC 532 based on the indication received via the bus 222. In response, a processor of the wireless communications interface IC 560 may execute code in memory of the wireless communications interface IC 560 to repeatedly increment the dim level of a luminaire until the brightness of the luminaire reaches a maximum or until the energy stored in the one or more capacitors 443 is insufficient to power the wireless communications interface IC 560 at or above a minimum operating voltage of the wireless communications interface IC 560.

Similarly, the wireless communications interface IC 560 may determine that the energy is harvested via the second NFC module IC 534 based on an indication received via the bus 222. In response, the processor of the wireless communications interface IC 560 may execute code in memory of the wireless communications interface IC 560 to repeatedly decrement the dim level of a luminaire until the brightness of the luminaire reaches a minimum (off) or until the energy stored in the one or more capacitors 543 is insufficient to power the wireless communications interface IC 560 at or above a minimum operating voltage of the wireless communications interface IC 560.

The wireless communications interface IC 560 may repeatedly increment or decrement the dim level of the luminaire based on a starting point of a dim level received via the bus 222 or a last stored dim level stored in memory of the wireless communications interface IC 560 by transmitting non-NFC radio transmissions via the antenna(s) 155 to instruct the luminaire to increment or decrement the dim level. In some embodiments, the wireless communications interface IC 560 may instruct the luminaire to increment or decrement the dim level linearly or exponentially via a look-up table stored in memory of the wireless communications interface IC 560. In other embodiments, the wireless communications interface IC 560 may repeatedly increment or decrement a different characteristic of a luminaire such as a color temperature or a combination of light intensity and color temperature. In still other embodiments, the wireless communications interface IC 560 may repeatedly increment or decrement a characteristic of a different type of load.

Figure 5B:
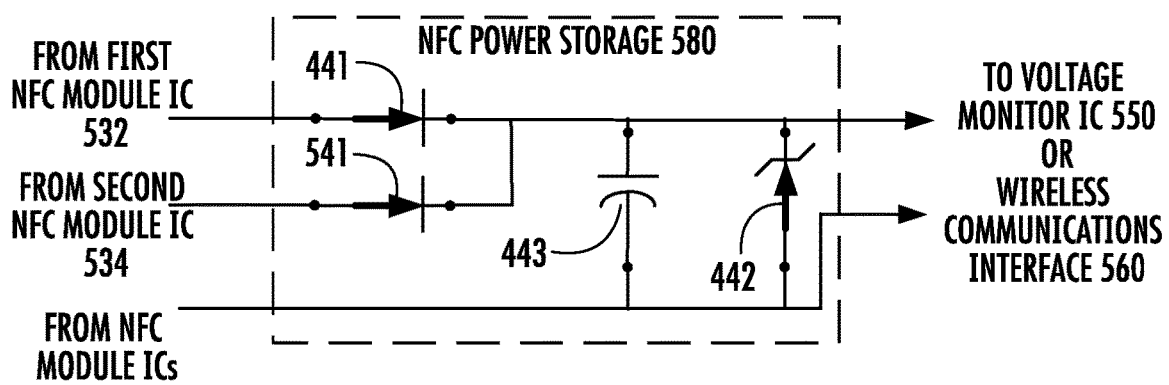
FIG. 5B illustrates an alternative embodiment of a power storage device such as the NFC power storage device shown in FIG. 5A.

FIG. 5B illustrates an alternative embodiment of a power storage device 580 such as the NFC power storage device 540 shown in FIG. 5A. In some embodiments, the NFC power storage 580 replaces the NFC power storage 540 shown in FIG. 5A. The NFC power storage 580 couples the first NFC module IC 532 and the second NFC module IC 534 with the capacitors 443 (or other power storage elements) and the Zener diodes 442 via the rectifying diodes 441 and 541 respectively. As such, the NFC power storage 580 advantageously charges the capacitors 443 with energy captured by the NFC antenna(s) 530 and the NFC antenna(s) 533.

The power storage device 580 may output power from the capacitors 443 via a voltage monitor IC 550 if the POR of the wireless communications interface IC 560 is not programmable or directly to the wireless communications interface IC 560 if the POR is programmable.

Figure 6:
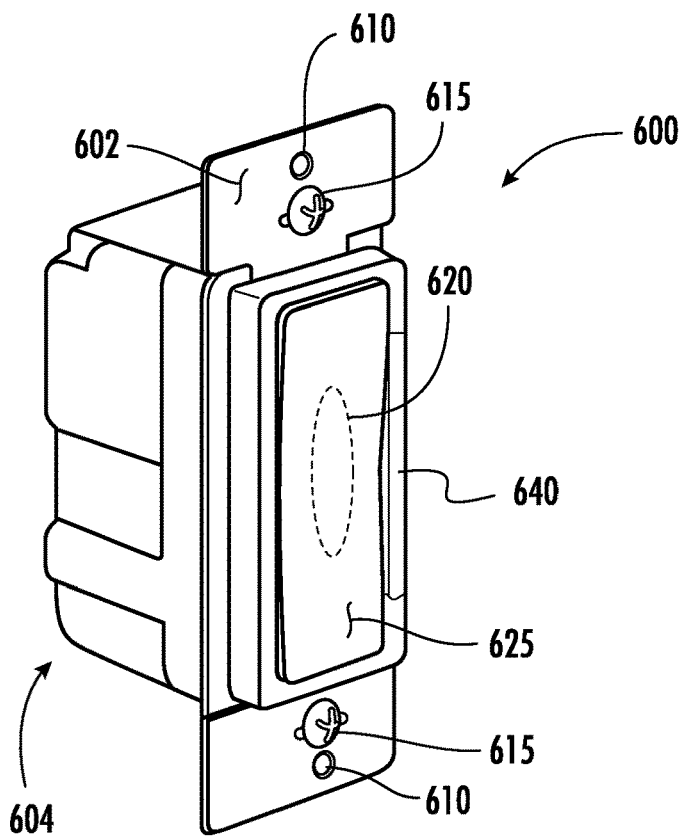
FIG. 6 illustrates an embodiment of housing for a control device such as the control devices shown in FIGS. 1-5.

FIG. 6 illustrates an embodiment of housing 600 for a control device such as the control devices shown in FIGS. 1-5. The housing 600 includes a mounting plate 602 to mount the housing 600 to an electrical junction box via openings 615. The mounting plate 602 may also include openings 610 to mount a wall plate over the electrical junction box and mounting plate 602.

The housing 600 includes an enclosure 604 to contain the components and circuitry for a housing 600 such as the components and circuitry of the control devices 120, 220, 320, 420, and 520 in FIGS. 1-5. The housing 600 may include an NFC antenna 620 at a fixed location such as the NFC antenna(s) 130 and 530 in FIGS. 1-5, and may include mechanical input devices such as a switch 625 and a dim level selector 640.

Figure 7:
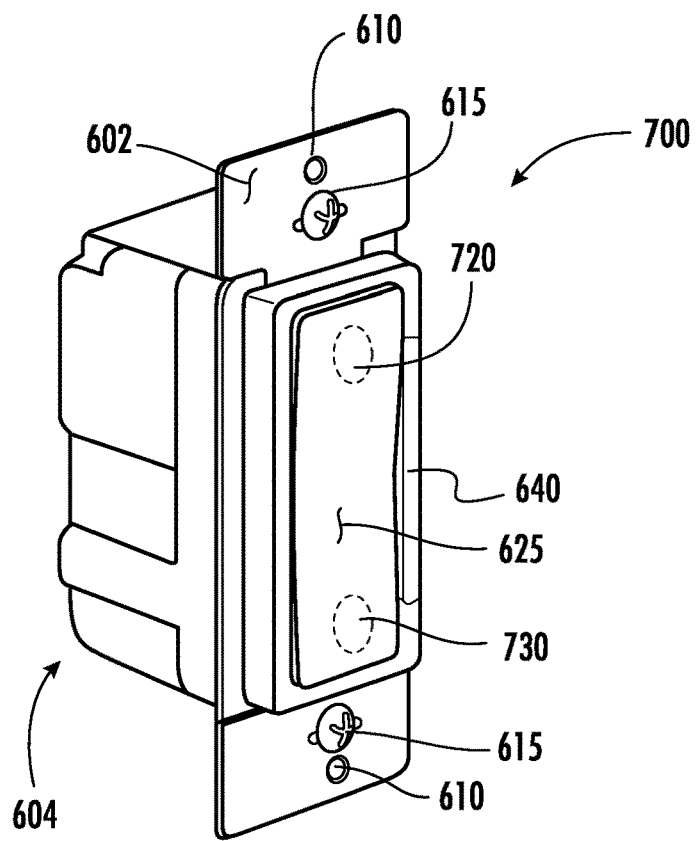
FIG. 7 illustrates an alternative embodiment of housing for a control device such as the control devices shown in FIGS. 1-5.

FIG. 7 illustrates an alternative embodiment of housing 700 for a control device such as the housing 600 shown in FIG. 6. The housing 700 includes a mounting plate 602 to mount the housing 600 to an electrical junction box via openings 615. The mounting plate 602 may also include openings 610 to mount a wall plate over the electrical junction box and mounting plate 602.

The housing 700 includes an enclosure 604 to contain the components and circuitry for a housing 700 such as the components and circuitry of the control devices 120, 220, 320, 420, and 520 in FIGS. 1-5. The housing 700 may include two independent NFC antennas 720 and 730 at fixed locations within the housing 700 such as the NFC antenna(s) 530 and 533 in FIG. 5A. The housing 700 may also include mechanical input devices, a switch 625 and a dim level selector 640, such as the mechanical input device 350 shown in FIG. 3.

Figure 8:
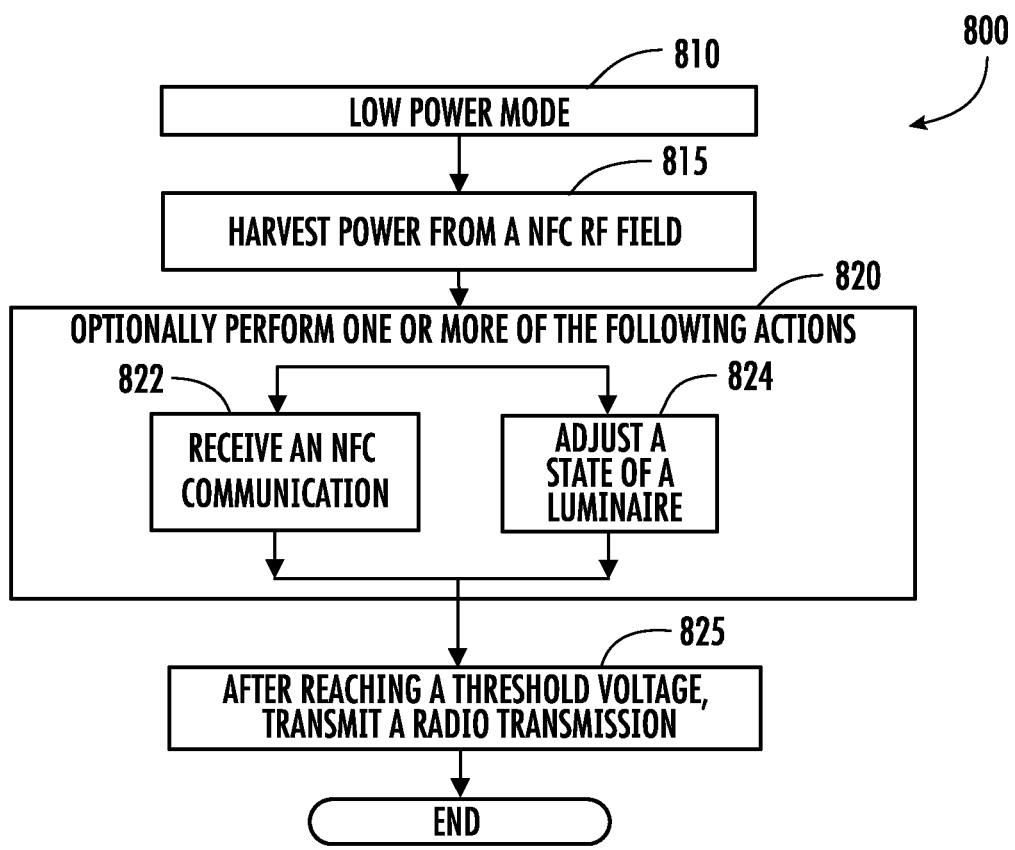
FIG. 8 illustrates an embodiment of a flowchart for the control devices shown in FIGS. 1-5.

FIG. 8 illustrates an embodiment of a flowchart 800 for the control devices shown in FIGS. 1-5. The flowchart 800 begins at element 810 with the control device in a low power or no-power mode. When an NFC device is located near an NFC antenna and an NFC RF field from the NFC device applies an alternating electromagnetic field to the NFC antenna, the NFC antenna may capture energy (power) and pass the energy to an NFC power storage such as the NFC power storage 140, 240, 440, 540, and 580 shown in FIGS. 1-5 to harvest the energy (element 815). For instance, a user may execute an app on a smart phone to read or write to an NFC tag. The smart phone may include an NFC device that generates an NFC RF field at the NFC antenna of the control device, allowing the control device to harvest power from the NFC RF field.

At element 820, the flowchart 800 shows two optional actions and the control device may optionally perform any one or more of the actions or, alternatively, skip to element 825. The two optional actions include receiving an NFC communication from the NFC device at element 822. In other words, the control device may optionally receive a communication from the NFC device that includes data such as a command, a recipient address for a receiving device or target device, authentication data, personal data, and/or the like to transmit a packet to a receiving device such as the receiving devices shown in FIG. 1. In some embodiments the packet may comprise the data and, in other embodiments, the control device may generate the packet based on the data.

The two optional actions also include adjusting a state of a luminaire at element 824. For example, the control device may interpret contact with an NFC RF field at an NFC antenna as an instruction to change the state of the luminaire associated with the control device. In some embodiments, the state may include an on/off state so application of the NFC RF field to the NFC antenna of a control device may turn on a luminaire if the luminaire is currently off or turn off a luminaire if the luminaire is currently powered. In such embodiments, the control device may generate and transmit a non-NFC wireless radio transmission to the luminaire to change the state of the luminaire. In some embodiments, the control device may maintain the current state of the luminaire so such embodiments may transmit a command to turn off power to a luminaire that is currently in a powered-on state or transmit a command to turn on power to a luminaire that is currently in a powered-off state.

Some embodiments may receive an NFC communication (element 822) and adjust the state of a luminaire (element 824) in response to an NFC RF field at an NFC antenna of the control device. Other embodiments may transmit one or more predetermined radio transmissions in response to an NFC RF field at an NFC antenna of the control device and thus skip element 820. For example, the control device may react to the NFC RF field by harvesting power from the RF field and transmitting an instruction to a lighting control device to power on or set a scene in a space or room. The scene may include a brightness and color temperature of luminaires in the space or room.

To illustrate, two or more control devices may control the lighting in a room. A first control device may be located at an entrance of a room in an office space and may turn on the luminaires to a preset brightness when an NFC device generates an NFC RF field at the NFC antenna of the first control device. A second control device may be located at an exit of the building and may turn off all lighting in the office space in response to application of an NFC RF field at the NFC antenna.

At element 825, after the NFC power storage reaches a threshold voltage output, a wireless communications interface for the first control device, such as the wireless communications interfaces discussed in conjunction with FIGS. 1-5, may transmit a non-NFC radio transmission to a group address for the luminaires in the room to turn on the lights at the preset brightness. Similarly, at element 825, after the NFC power storage reaches a threshold voltage output, a wireless communications interface for the second control device, such as the wireless communications interfaces discussed in conjunction with FIGS. 1-5, may transmit a non-NFC radio transmission to a group address or a broadcast address for the luminaires in the entire office to turn off the lights. In other embodiments, the wireless communications interface for the second control device may transmit a command to lighting control system to turn off the lights in the entire office.

The control device may wait after performing the action(s) at elements 820 and 825 until energy is harvested from another NFC RF field.

Figure 9:
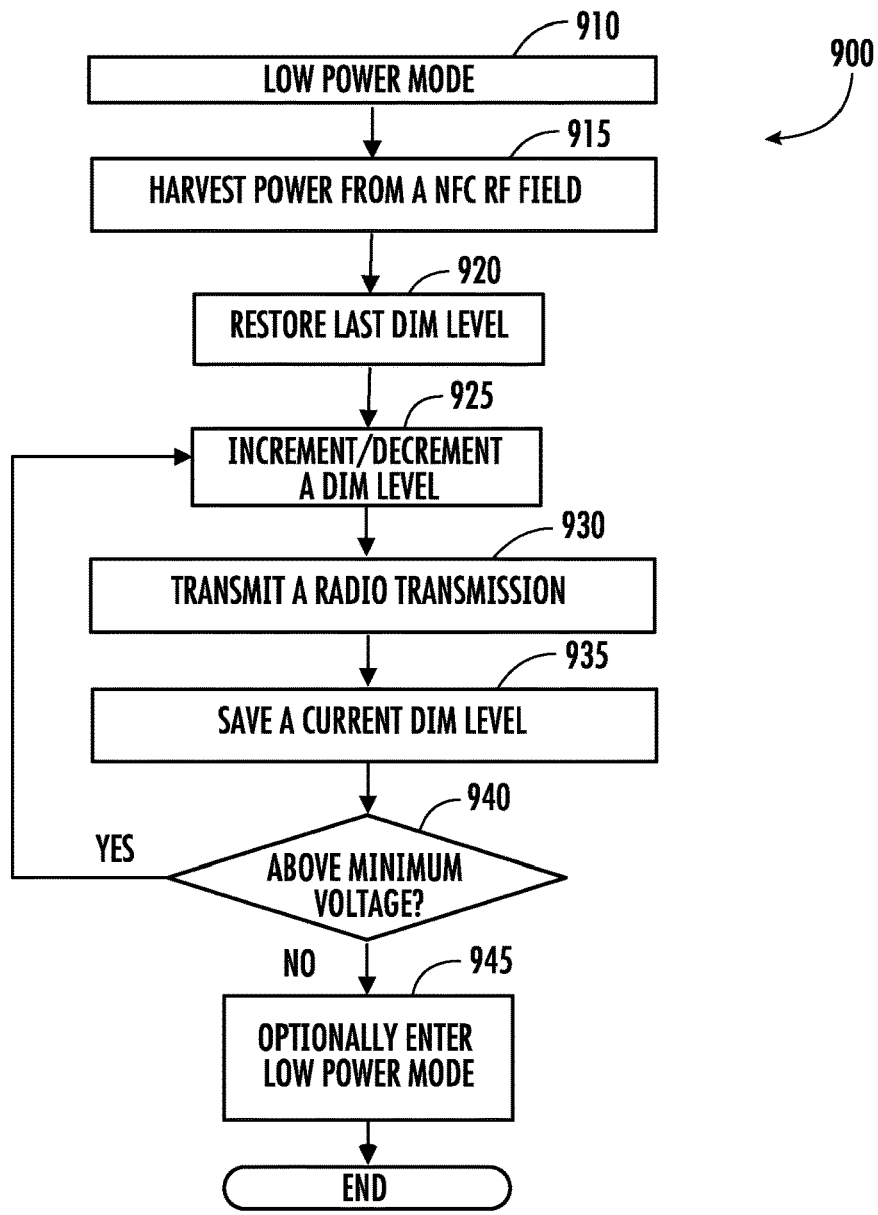
FIG. 9 illustrates an alternative embodiment of a flowchart for the control devices shown in FIGS. 1-5.

FIG. 9 illustrates an alternative embodiment of a flowchart 900 for the control devices shown in FIGS. 1-5. The flowchart 900 begins at element 910 with the control device in a low power or no-power mode. At element 915, the control device may harvest power from an NFC RF field in an NFC power storage of the control device such as the NFC power storage 140, 240, 440, 540, and 580 shown in FIGS. 1-5. For instance, a user may activate an NFC radio on an NFC device to transfer power to the control device.

The control device may restore the last dim level or access the last dim level of a lighting device from memory within or accessible to a wireless communications interface of the control device (element 920). In other embodiments, the control device may receive data via an NFC that indicates the dim level of the lighting device.

After determining the current dim level of the lighting device, the control device may increment or decrement the dim level (element 925), transmit a non-NFC wireless radio transmission to the lighting device to instruct the lighting device to increment or decrement the dim level (element 930), and save the current dim level of the lighting device in memory of the control device (element 935). For instance, some embodiments may increment a brightness of a lighting device to a maximum brightness and then either reset the brightness to zero and start incrementing the dim level from zero or begin to decrement the brightness after the brightness reaches a maximum brightness.

In other embodiments, the NFC RC field may include a write instruction along with data to write the data to an NFC module of the control device such as the NFC module(s) 132 shown in FIGS. 1-5. In such embodiments, the data may include an instruction to increment or to decrement the brightness of the lighting device.

At element 940, the control device determines if the voltage output of the NFC power storage of the control device is above the minimum voltage for performing a subsequent radio transmission. If so, the control device may repeat the elements 925 through 935 until there is not sufficient power remaining for an additional radio transmission.

Once the power remaining in the NFC power storage is insufficient to transmit another radio transmission, the control device may optionally enter a low power mode (element 945).

Figure 10:
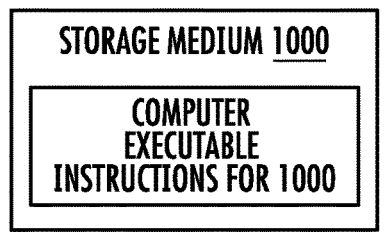
FIG. 10 illustrates an embodiment of a storage medium such as the memory for the code and data shown in FIGS. 2-3.

FIG. 10 illustrates an embodiment of a storage medium 1000 such as the memory 264 for the code and data shown in FIGS. 2-3. Storage medium 1000 may comprise an article of manufacture. In some examples, storage medium 1000 may include any non-transitory computer readable medium or machine-readable medium, such as an optical, magnetic or semiconductor storage. Storage medium 1000 may store diverse types of computer executable instructions, such as instructions to implement logic flows and/or techniques described herein. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

EXAMPLES OF FURTHER EMBODIMENTS

The following examples pertain to further embodiments. Specifics in the examples may be used anywhere in one or more embodiments.

Example 1 is a control device, comprising: an antenna; a near-field communications (NFC) module coupled with the antenna; a power storage coupled with the NFC module to harvest energy from a radio frequency (RF) field; and a wireless communications interface coupled with the power storage to receive power to generate and transmit a non-NFC radio transmission in response to the energy harvested from the RF field. Example 2 is the control device of claim 1, further comprising a bus coupled with the NFC module and the wireless communications interface. Example 3 is the control device of claim 1, further comprising a voltage monitor coupled with the power storage to apply power to the wireless communications interface after a voltage at an output of the power storage reaches a voltage threshold. Example 4 is the control device of claim 1, further comprising a switch coupled with the wireless communications interface. Example 5 is the control device of claim 4, further comprising a dim level selector coupled with the wireless communications interface, the dim level selector comprising a second switch, a touch bar, or a slide bar. Example 6 is the control device of claim 1, wherein the wireless communications interface comprises a programmable power on reset (POR) or both a programmable POR and a programmable brown out detect (BOD). Example 7 is the control device of claim 1, wherein the power storage comprises at least one diode to direct power from the NFC module to a power storage element. Example 8 is the control device of claim 7, wherein the power storage element comprises a capacitor. Example 9 is the control device of claim 7, wherein the power storage element comprises a battery. Example 10 is the control device of claim 1, wherein the power storage comprises a voltage regulator. Example 11 is the control device of claim 10, wherein the voltage regulator comprises a Zener diode. Example 12 is the control device of claim 1, wherein the wireless communications interface comprises a processor coupled with memory comprising code, wherein execution of the code by the processor causes the processor to transmit a non-NFC packet in the non-NFC radio transmission. Example 13 is the control device of claim 12, wherein the non-NFC packet comprises data wirelessly received by the NFC module. Example 14 is the control device of claim 12, wherein the non-NFC packet comprises data stored in the memory of the wireless communications interface. Example 15 is the control device of claim 12, wherein the non-NFC packet comprises data determined by execution of the code by the processor. Example 16 is the control device of claim 12, wherein the communication interface is configured to wirelessly transmit the non-NFC packet in accordance with a wireless communications protocol, wherein the communication interface is capable of transmitting the packet in accordance with one or more wireless communications protocols from a group of wireless communications protocols consisting of a low power Wi-Fi protocol, a wireless personal area network (WPAN) protocol, a Bluetooth protocol, a ZigBee protocol, a Z-Wave protocol; and an Adaptive Network Topology (ANT) wireless protocol.

Example 17 is a control device, comprising: a first antenna; a first near-field communications (NFC) module coupled with the first antenna; a second antenna; a second NFC module coupled with the second antenna; a power storage coupled with the first NFC module and with the second NFC module to harvest energy from a radio frequency (RF) field; and a wireless communications interface coupled with the power storage to receive power to: execute code with a processor of the wireless communications interface to cause the processor to decrement a dim level for a lighting load in response to energy harvested from the RF field via the first antenna and to increment the dim level for the lighting load in response to energy harvested from the RF field via the second antenna; and generate and transmit a non-NFC radio transmission to cause a change in the dim level of the lighting load. Example 18 is the control device of claim 17, further comprising a first bus coupled with the first NFC module, the second NFC module, and the wireless communications interface. Example 19 is the control device of claim 17, further comprising a voltage monitor coupled with the power storage to apply power to the wireless communications interface after a voltage at an output of the power storage reaches a voltage threshold. Example 20 is the control device of claim 17, further comprising a switch coupled with the wireless communications interface. Example 21 is the control device of claim 20, further comprising a dim level selector coupled with the wireless communications interface, the dim level selector comprising a second switch, a touch bar, or a slide bar. Example 22 is the control device of claim 17, wherein the wireless communications interface comprises a programmable power on reset (POR) or both a programmable POR and a programmable brown out detect (BOD). Example 23 is the control device of claim 17, wherein the power storage comprises at least one diode to direct power from the NFC module to a power storage element. Example 24 is the control device of claim 23, wherein the power storage element comprises a capacitor. Example 25 is the control device of claim 23, wherein the power storage element comprises a battery. Example 26 is the control device of claim 17, wherein the power storage comprises a voltage regulator. Example 27 is the control device of claim 26, wherein the voltage regulator comprises a Zener diode. Example 28 is the control device of claim 17, wherein the wireless communications interface comprises a processor coupled with memory comprising code, wherein execution of the code by the processor causes the processor to transmit a non-NFC packet in the non-NFC radio transmission. Example 29 is the control device of claim 28, wherein the non-NFC packet comprises data wirelessly received by the NFC module. Example 30 is the control device of claim 28, wherein the non-NFC packet comprises data stored in the memory of the wireless communications interface. Example 31 is the control device of claim 28, wherein the non-NFC packet comprises data determined by execution of the code by the processor. Example 32 is the control device of claim 28, wherein the communication interface is configured to wirelessly transmit the non-NFC packet in accordance with a wireless communications protocol, wherein the communication interface is capable of transmitting the packet in accordance with one or more wireless communications protocols from a group of wireless communications protocols consisting of a low power Wi-Fi protocol, a wireless personal area network (WPAN) protocol, a Bluetooth protocol, a ZigBee protocol, a Z-Wave protocol; and an Adaptive Network Topology (ANT) wireless protocol.

We claim:

1. A control device, comprising:
   an antenna;
   a near-field communications (NFC) module coupled with the antenna;
   a power storage coupled with the NFC module, the power storage comprising a capacitance to capture energy from a radio frequency (RF) field, wherein the power storage comprises a Zener diode to regulate a voltage output of the power storage; and
   a wireless communications interface coupled with the power storage to receive power to generate and transmit a non-NFC radio transmission in response to the energy captured from the RF field, wherein the wireless communications interface comprises a hysteresis circuit, wherein the hysteresis circuit comprises a programmable brown out detect (BOD) to terminate operation of the wireless communications interface and a programmable power-on-reset (POR) to initiate operation of the wireless communication interface, wherein the BOD and the POR are each programmed to a voltage amount based on the capacitance of the power storage and power required to complete the non-NFC radio transmission, to provide sufficient energy to the wireless communications interface to transmit at least the non-NFC radio transmission prior to termination of operation of the wireless communication interface by the BOD, the non-NFC radio transmission comprising data including an instruction configured to change a state of a luminaire or adjust a dim level of the luminaire.

2. The control device of claim 1, further comprising a bus coupled with the NFC module and the wireless communications interface.

3. The control device of claim 1, further comprising a voltage monitor coupled with the power storage to apply power to the wireless communications interface.

4. The control device of claim 1, further comprising a switch coupled with the wireless communications interface.

5. The control device of claim 4, further comprising a dim level selector coupled with the wireless communications interface, the dim level selector comprising a second switch, a touch bar, or a slide bar.

6. The control device of claim 1, wherein the power storage comprises at least one diode to direct power from the NFC module to a power storage element.

7. The control device of claim 6, wherein the power storage element comprises a battery.

8. The control device of claim 1, further comprising a voltage regulator, wherein the voltage regulator comprises the Zener diode in parallel with a capacitor.

9. The control device of claim 1, wherein the data comprises an address for one or more lighting fixtures, the combination of the address and the instruction configured to adjust the state of the luminaire or adjust the dim level of the luminaire.

10. The control device of claim 9, wherein the address comprises a group address or a broadcast address for the luminaire and one or more other luminaires.

11. The control device of claim 9, wherein the communication interface is configured to wirelessly transmit the non-NFC packet in accordance with a wireless communications protocol, wherein the communication interface is capable of transmitting the packet in accordance with one or more wireless communications protocols from a group of wireless communications protocols consisting of a low power Wi-Fi protocol, a wireless personal area network (WPAN) protocol, a Bluetooth protocol, a ZigBee protocol, a Z-Wave protocol; and an Adaptive Network Topology (ANT) wireless protocol.

12. A control device, comprising:
an antenna;
more than one near-field communications (NFC) module coupled with the antenna;
at least one power storage coupled with the more than one NFC module to harvest energy from a radio frequency (RF) field, the at least one power storage comprising a capacitance, wherein the at least one power storage comprises at least one voltage regulator to regulate a voltage output of the at least one power storage; and
a wireless communications interface coupled with the at least one power storage to receive power to generate and transmit a non-NFC radio transmission in response to the energy harvested from the RF field, wherein the wireless communications interface comprises a hysteresis circuit, wherein the hysteresis circuit comprises a programmable brown out detect (BOD) to terminate operation of the wireless communications interface and a programmable power-on-reset (POR) to initiate operation of the wireless communication interface, wherein the BOD and the POR are each programmed to a voltage amount based on the capacitance of the at least one power storage and power required to complete the non-NFC radio transmission, to provide sufficient energy to the wireless communications interface to transmit at least the non-NFC radio transmission prior to termination of operation of the wireless communication interface by the BOD, the non-NFC radio transmission comprising data including an instruction configured to change a state of a luminaire or adjust a dim level of the luminaire.

13. The control device of claim 12, further comprising a bus coupled with the more than one NFC module and the wireless communications interface.

14. The control device of claim 12, further comprising at least one voltage monitor coupled with the at least one power storage to apply power to the wireless communications interface.

15. The control device of claim 12, further comprising a switch coupled with the wireless communications interface.

16. The control device of claim 15, further comprising a dim level selector coupled with the wireless communications interface, the dim level selector comprising a second switch, a touch bar, or a slide bar.

17. The control device of claim 12, wherein the at least one power storage comprises at least one diode to direct power from the NFC module to at least one power storage element.

18. The control device of claim 17, wherein the at least one power storage element comprises at least one battery.

19. The control device of claim 18, wherein the at least one voltage regulator comprises at least one Zener diode.

20. The control device of claim 12, wherein the data comprises an address for with one or more lighting fixtures, the combination of the address and the instruction configured to adjust the state of the luminaire or adjust the dim level of the luminaire.

21. The control device of claim 20, wherein the address comprises a group address or a broadcast address for the luminaire and one or more other luminaires.

22. The control device of claim 20, wherein the communication interface is configured to wirelessly transmit the non-NFC packet in accordance with a wireless communications protocol, wherein the communication interface is capable of transmitting the packet in accordance with one or more wireless communications protocols from a group of wireless communications protocols consisting of a low power Wi-Fi protocol, a wireless personal area network (WPAN) protocol, a Bluetooth protocol, a ZigBee protocol, a Z-Wave protocol; and an Adaptive Network Topology (ANT) wireless protocol.

* * * * *